US011251862B2

United States Patent
Zhou et al.

(10) Patent No.: US 11,251,862 B2
(45) Date of Patent: Feb. 15, 2022

(54) SYSTEMS AND METHODS FOR SIMULTANEOUS OPERATION OF DISSIMILAR SATCOM SYSTEMS

(71) Applicant: Honeywell International Inc., Morris Plains, NJ (US)

(72) Inventors: Zhenning Zhou, Shanghai (CN); Zhijian Xu, Beijing (CN); Pi-Shien Liu, Phoenix, AZ (US); Kai Tian, Beijing (CN); Minghui Chen, Beijing (CN); Mei Tian, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/929,094

(22) Filed: Jul. 14, 2020

(65) Prior Publication Data
US 2022/0021443 A1    Jan. 20, 2022

(51) Int. Cl.
*H04B 7/185* (2006.01)
*H04W 48/18* (2009.01)
*H04W 36/14* (2009.01)
*H04B 7/155* (2006.01)
*H04W 36/30* (2009.01)
*H04W 84/06* (2009.01)

(52) U.S. Cl.
CPC ......... *H04B 7/18508* (2013.01); *H04B 7/155* (2013.01); *H04W 36/14* (2013.01);
(Continued)

(58) Field of Classification Search
CPC ............ H04B 7/18519; H04B 7/18513; H04B 7/18508; H04B 7/185; H04B 7/18517;
(Continued)

(56) References Cited

U.S. PATENT DOCUMENTS 5,777,577 A    7/1998   Kumar
6,643,273 B2   11/2003  Chao
(Continued)

FOREIGN PATENT DOCUMENTS

| CN | 107707295 A | 2/2018 |
|----|-------------|--------|
| CN | 108449150 A | 8/2018 |
| EP | 1900637 A1  | 3/2008 |

OTHER PUBLICATIONS

European Patent Office, "Extended European Search Report from EP Application No. 21184109.3", from Foreign Counterpart to U.S. Appl. No. 16/929,094, dated Dec. 15, 2021, pp. 1-11, Published: EP.

*Primary Examiner* — Keith Ferguson
(74) *Attorney, Agent, or Firm* — Fogg & Powers LLC (57) ABSTRACT

In one embodiment, a method is provided. The method includes selecting, with a communications management system, a first satellite communications (SATCOM) system of a plurality of SATCOM systems as a primary SATCOM system based on user input, received by a human machine interface, that identifies the first SATCOM system as a user-selected SATCOM system. The method further includes automatically switching, with the communications management system, the primary SATCOM system from the first SATCOM system to a second SATCOM system of the plurality of SATCOM systems in response to: a fault status for the first SATCOM system; a loss of channel availability for the first SATCOM system; and/or a failed datalink message transmission for the first SATCOM system. The method further includes establishing a communication link between the primary SATCOM system and a ground station.

17 Claims, 5 Drawing Sheets

(52) U.S. Cl.
CPC ........... *H04W 36/30* (2013.01); *H04W 48/18* (2013.01); *H04W 84/06* (2013.01)

(58) Field of Classification Search
CPC ............ H04B 7/18506; H04B 7/18515; H04B 7/1851; H04B 7/18573
See application file for complete search history.

(56) References Cited

U.S. PATENT DOCUMENTS

| | | | |
|---|---|---|---|
| 7,698,025 B1 * | 4/2010 | Cornell | G01C 23/00 |
| | | | 701/3 |
| 8,019,338 B2 | 9/2011 | Malaga et al. | |
| 8,606,266 B1 | 12/2013 | Mitchell | |
| 9,100,361 B1 | 8/2015 | Lucchesi et al. | |
| 9,553,658 B1 | 1/2017 | Bantoft et al. | |
| 9,750,079 B1 * | 8/2017 | Mitchell | H04B 7/195 |
| 9,800,942 B2 | 10/2017 | Suzuki et al. | |
| 10,164,705 B1 | 12/2018 | Bowen et al. | |
| 10,433,208 B2 | 10/2019 | Gopal et al. | |
| 2004/0137842 A1 * | 7/2004 | Iwata | H04B 7/18541 |
| | | | 455/12.1 |
| 2012/0295537 A1 | 11/2012 | Zaruba et al. | |
| 2015/0301187 A1 | 10/2015 | Lee et al. | |
| 2016/0119054 A1 * | 4/2016 | Foxworthy | H04B 7/18513 |
| | | | 370/319 |
| 2018/0091567 A1 * | 3/2018 | Bekiares | H04L 65/4069 |
| 2019/0181946 A1 | 6/2019 | Wendling | |
| 2020/0135034 A1 * | 4/2020 | Girod | H04B 7/18508 |

* cited by examiner

SYSTEMS AND METHODS FOR SIMULTANEOUS OPERATION OF DISSIMILAR SATCOM SYSTEMS

BACKGROUND

Aircraft rely on various communication techniques to facilitate safe and efficient navigation. Among other modes of communication, satellite communication (SATCOM) systems enable long-range voice and data communications between aircraft and other entities capable of receiving SATCOM communications, such as other aircraft and air traffic control stations. An aircraft may be equipped with more than one SATCOM system, for example, two SATCOM systems, where each SATCOM system includes one or more satellite data units (SDUs). The SATCOM systems may be identical (referred to herein as a similar SATCOM systems) or different (referred to herein as a dissimilar SATCOM systems). When an aircraft includes more than one SATCOM system, it must be determined which SATCOM system should be the primary SATCOM system used for communication at a particular time.

Typically, the primary SATCOM system is selected by built-in hardware configuration settings between the SDUs of the different SATCOM systems such that one SATCOM system is configured to be the "master" system, while the other SATCOM system is configured as the "slave" system. When the master system is functional, the master system acts as the primary SATCOM system, while the slave system acts as a support SATCOM or backup SATCOM system in case the master system becomes non-functional. Existing systems implement a crosstalk bus that directly connects the two SATCOM systems, which is used to determine priority and communicate information regarding status and functionality to each other.

However, this approach can lead to inflexibility for aircraft operators in selecting a primary SATCOM system and increased costs due to cost of service variation between different data service provider (DSP) satellite networks to communicate with ground stations in different regions.

SUMMARY

In one embodiment, a method is provided. The method includes selecting, with a communications management system, a first satellite communications (SATCOM) system of a plurality of SATCOM systems as a primary SATCOM system based on user input, received by a human machine interface, that identifies the first SATCOM system as a user-selected SATCOM system. The method further includes automatically switching, with the communications management system, the primary SATCOM system from the first SATCOM system to a second SATCOM system of the plurality of SATCOM systems in response to: a fault status for the first SATCOM system; a loss of channel availability for the first SATCOM system; and/or a failed datalink message transmission for the first SATCOM system. The method further includes establishing a communication link between the primary SATCOM system and a ground station.

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary, to employ concepts of the various patents, applications, and publications as identified herein to provide yet further embodiments.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. The following detailed description is, therefore, not to be taken in a limiting sense.

The following disclosure describes techniques for an integrated operation of dissimilar satellite communications (SATCOM) systems. In the various examples described herein, a SATCOM system can be selected from a plurality of SATCOM systems based on user input received via a human machine interface (for example, a graphical user interface). Upon user selection, techniques for evaluating the efficacy of the user-selected SATCOM are performed. In situations where the user-selected SATCOM system is functioning normally, the user-selected SATCOM system is configured to be the primary SATCOM system until the user-selected SATCOM system becomes unavailable or the user changes their selection of SATCOM system. One illustration of such a change occurs when the pilot or another user selects a different SATCOM system to use for satellite communications, in which case the communications management system switches the primary SATCOM to the different SATCOM system if it is available. At any point, the user remains free to select a different SATCOM system as the user-selected SATCOM system, and the techniques described below can take a changed user preference into consideration when selecting the primary SATCOM system.

In some circumstances, the user may select a SATCOM system as the user-selected SATCOM system, only to have the user-selected SATCOM system unable to properly function. Further, the user-selected SATCOM system may at first function normally, but may indicate that the user-selected SATCOM system suffers from a malfunction at some later time. For example, the user-selected SATCOM system could suffer from a system fault, a loss of satellite communication, and/or a failed datalink message transmission. In this situation, the primary SATCOM system can be switched from the user-selected SATCOM system to another available SATCOM system automatically via a communications management system. The techniques disclosed below can thus select an available SATCOM system using both system logic and user input as an integrated solution. After the user selects a SATCOM system, the primary SATCOM system can be automatically switched to a different SATCOM system without additional input from the user in the event of a fault. In some circumstances, the communications management system can switch back to the user-selected SATCOM system if the user-selected SATCOM system subsequently becomes available.

A SATCOM system that is available means that a successful communications link can be established using the SATCOM system. When the SATCOM system is selected by the user, the user-selected SATCOM system is given highest priority and operates as the primary SATCOM system unless the user-selected SATCOM system becomes unavailable. Example instances of when a SATCOM system is unavailable include when the SATCOM system experiences a system fault or failure, the SATCOM system reports a loss of communications with an external entity, and/or when message transmission via datalink cannot be made using the SATCOM system.

The primary SATCOM system determination is made by a communications management system that is separate from the SATCOM systems. This configuration eliminates the need for direct communication between the SATCOM systems in order to establish priority, including the elimination of a crosstalk bus used to set SATCOM priority via hardware configuration. The techniques described herein can therefore provide a flexible and integrated system for simultaneous operation of dissimilar SATCOM systems not presented by existing systems, and the techniques described herein can reduce costs by enabling the user to select the most cost-effective SATCOM system for a particular region.

Figure 1:
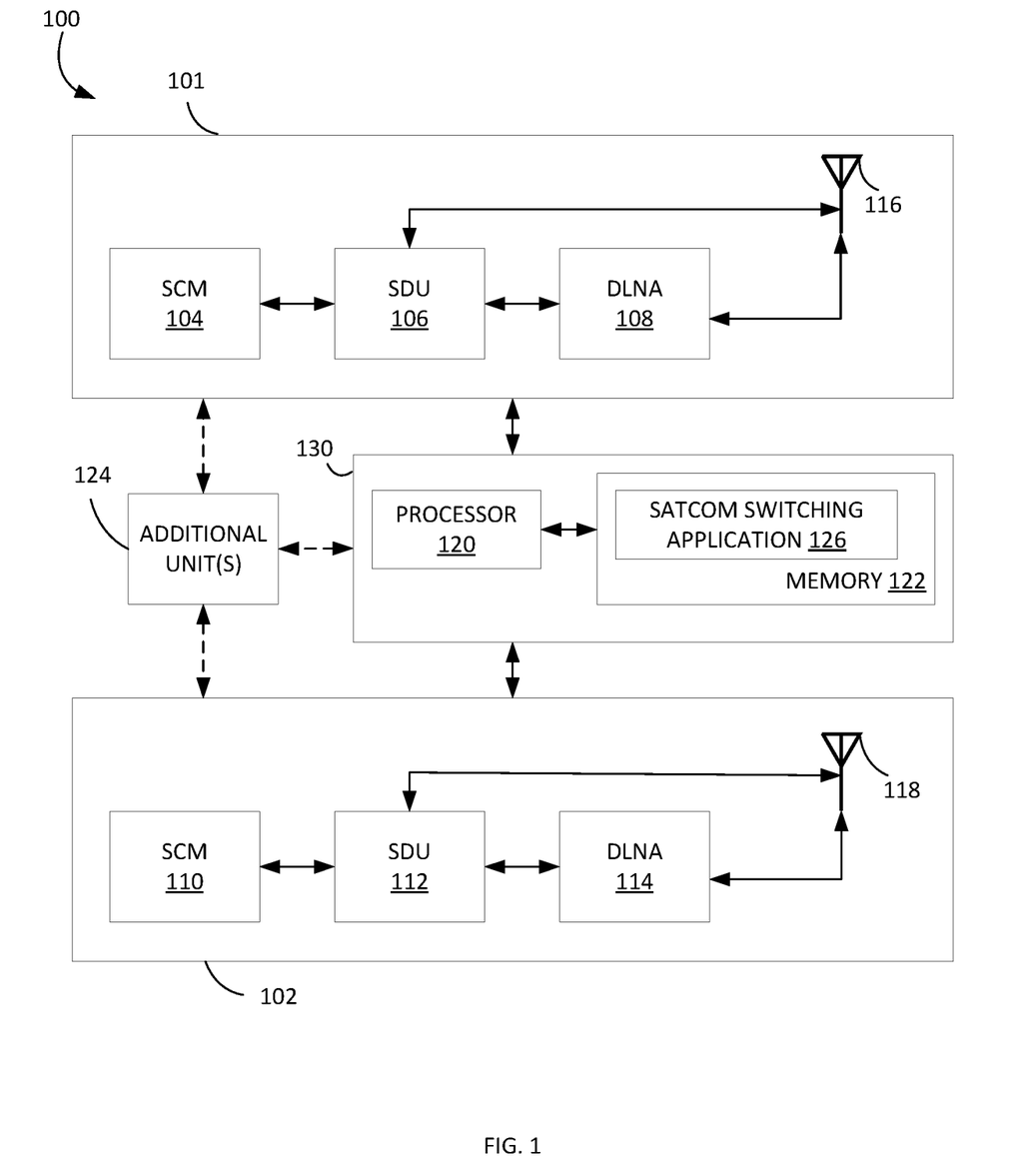
FIG. 1 is a diagram of an example system configured to select a primary SATCOM system.

FIG. 1 illustrates a diagram of an exemplary communications system 100. Communications system 100 includes a first SATCOM system 101 and a second SATCOM system 102. Although system 100 depicts two distinct SATCOM systems 101 and 102, system 100 may include a greater number of SATCOM systems and the principles described herein also apply to a different number of SATCOM systems (e.g., three of more SATCOM systems). Two SATCOM systems are therefore illustrated to clarify and explain the principles described throughout the disclosure.

Communications system 100 may be implemented in a vehicle, or may be physically, electrically, and/or communicatively coupled to a vehicle, for example, to assist the vehicle with establishing communication with other external entities. Such entities may include another vehicle and/or ground stations. In some examples, the vehicle may include an aircraft, and an aircraft is referenced to explain the principles described throughout the disclosure. However, the term vehicle is intended to include all such vehicles falling within the ordinary meaning of the term as understood by one having ordinary skill in the art, which includes, but is not limited to, aerial traversing vehicles (e.g., commercial, non-commercial, or recreational aircraft), unmanned or space traversing vehicles (e.g., satellites, urban air mobility vehicles), and ground traversing vehicles (e.g., automobiles, trucks, motorcycles).

In the example shown in FIG. 1, SATCOM system 101 includes a SATCOM configuration module (SCM) 104, a satellite data unit (SDU) 106, a diplexer low noise amplifier (DLNA) 108, and an antenna 116. In the example shown in FIG. 1, SATCOM system 102 includes a SCM 110, a SDU 112, a DLNA 114, and an antenna 118. Understanding that the components of SATCOM system 101 may function similarly to SATCOM system 102, reference will be made to the composition of SATCOM system 101, where similar principles apply to SATCOM system 102. However, SATCOM systems 101 and 102 may include different features or components, or may otherwise be implemented as dissimilar SATCOM systems.

In some examples, the SCM 104 stores configuration information of SDU 106. The SATCOM system 101 is associated with a particular data service provider (DSP); or, to put another way, SATCOM system 101 is configured to communicate via a satellite network of a particular DSP. Non-limiting examples of a DSP include Iridium Communications Inc. (Iridium) or Inmarsat PLC (Inmarsat). In some examples, SATCOM system 101 is configured to communicate using a satellite network of a first service provider (e.g., Iridium) as a default configuration, and SATCOM system 102 is configured to communicate using a satellite network of a second service provider (e.g., Inmarsat) as a default configuration. In some examples, the default configuration settings are stored in SCM 104 and the SDU 106 is particularly configured to communicate using the settings applicable to the default DSP. For example, the SDU 106 can be configured to communicate with particular modulation schemes, encoding schemes, frequency bands, etc. utilized by the default DSP and configured to communicate via the satellites of the default DSP's network.

In the example shown in FIG. 1, the DLNA 108 is communicatively coupled to the SDU 106 and the antenna 116. DLNA 108 is configured to amplify received radio frequency (RF) signals and/or transmitted RF signals, either from antenna 116 or SDU 106, which can improve the quality of communications received or sent by SATCOM system 101. Antenna 116 can be mounted external to an aircraft and receive RF signals. Antenna 116 can be further configured to receive downlink RF signals from DLNA 108 or from SDU 106. Antenna 116 can radiate these downlink signals, for example, to other vehicles or ground stations via a satellite network.

In some examples, the communications system 100 also includes one or more additional units 124. The additional unit(s) 124 can send data to and receive data from SATCOM system 101, SATCOM system 102, and/or a communications management system 130 via one or more bidirectional or unidirectional buses. In some examples, the one or more bidirectional or unidirectional buses comply with one or more Aeronautical Inc. (ARINC) standards. Example additional units 124 include a multi-function control and display unit (MCDU), an inertial reference system (IRS), a central maintenance computer (CMC), an engine indicating and crew alerting system (EICAS), a data loading module, an electronic flight bag (EFB), a SwiftBroadband services module, a cabin services module, a weight-on-wheels module, an aeronautical mobile satellite (route) service (AMS) module, or the like. In some examples, one or more of the additional units 124 (for example, the data loading module, EFB, SwiftBroadband services module, cabin services module), may be connected to SATCOM system 101 and/or 102 via a local area network (LAN) such as an Ethernet network. However, SATCOM system 101 is not directly coupled to SATCOM system 102, in contrast to traditional systems that utilize a crosstalk bus connecting SATCOM systems 101 and 102.

In the example shown in FIG. 1, the communications system 100 further includes a communications management system 130, which may receive data from or send data to any of additional unit(s) 124, SATCOM system 101, and/or SATCOM system 102. In some examples, the communications management system 130 is a communications management unit (CMU) or a communications management function (CMF). The communications management system 130 is configured to manage data communications sent or received by SATCOM systems 101 and 102, including communications sent by datalink message services such as Aircraft Communications Addressing and Reporting Systems (ACARS). In some examples, the communications management system 130 includes processor 120 coupled to memory 122. The processor 120 may include any one or combination of processors, microprocessors, digital signal processors, ASICs, FPGAs, and/or other similar variants thereof. The processor 120 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

Storage media can include, for example, a memory 122. In some examples, memory 122 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. Memory 122 may include SATCOM switching application 126 for implementing the SATCOM system switching logic described in further detail below, which may be executed by processor 120.

Unlike traditional systems, communications system 100 does not include a hard-wired priority configuration between SATCOM systems 101 and 102, and the crosstalk bus that connects the SATCOM systems and communicates status information between the SATCOM systems is unnecessary. Instead, communications system 100 enables both SATCOM systems 101 and 102 to be configurable as the primary SATCOM system based on directions received from communications management system 130. In some examples, SATCOM system 101 is selected as the primary/master SATCOM system, while SATCOM system 102 is selected as the secondary/slave system. However, SATCOM system 102 may later be designated the primary/master SATCOM system and SATCOM system 101 would then be designated the secondary/slave SATCOM system. In any case, communications management system 130 can automatically switch the primary SATCOM system from SATCOM system 101 to SATCOM system 102, and vice-versa, depending on user input and availability as discussed below.

When determining the primary SATCOM system, communications management system 130 initially designates which SATCOM system 101, 102 is the primary SATCOM system based on received user input. For example, a user can select which SATCOM system to be used to communicate with other aircraft or ground stations using a human machine interface, in which case the communications management system 130 designates the user-selected SATCOM system as the primary SATCOM system. Once a SATCOM system has been selected by the user, communications management system 130 can then send a signal to the appropriate SATCOM system corresponding to the user-selected SATCOM system requesting its status. If the user-selected SATCOM system is functioning properly, its SDU responds with a message indicating the user-selected SATCOM system is available, in which case communications management system 130 can send a message directing the user-selected SATCOM system to open a communications link via a satellite network.

To illustrate an example of operation of the communications system 100, a user can select SATCOM system 101, which is configured for operation using a satellite network of a first DSP (for example, Iridium), as the preferred SATCOM system for communications. In some examples, the user selects the SATCOM system preferred for communications using a human machine interface as described below with respect to FIGS. 2A-2B. Communications management system 130 then designates SATCOM system 101 to be the primary SATCOM system and initiates communications. Should the user later desire to use SATCOM system 102 (for example, when entering a different region), which is configured for operation using a satellite network of a second DSP (for example, Inmarsat), the user can then select SATCOM system 102. In that situation, communications management system 130 then designates SATCOM system 102 to be the primary SATCOM system if it is available.

In some situations, SATCOM system 101 may not function properly or may experience communication difficulties such that it becomes unavailable. In some examples, when the communications management system 130 receives a message that SATCOM system 101 is unavailable, the communications management system 130 is configured to automatically switch to a different SATCOM system (for example, SATCOM system 102) if it is available. In some examples, when a malfunction occurs, the unavailable SATCOM system (e.g., via the corresponding SDU) can notify communications management system 130 that a problem has occurred and optionally provide details on the specifics of the unavailability. In some examples, the unavailable SATCOM system is configured to report the status of the SATCOM system via an ARINC 429 system address label (SAL) (e.g., Label 270) indicating the status and datalink availability. In response to receiving an indication that the primary SATCOM system is unavailable, the communications management system 130 automatically switches to a different available SATCOM system (for example, SATCOM system 102). In additional or alternative embodiments, the communications management system 130 is configured to send periodic messages at a predetermined time interval (for example, every 30 seconds) requesting the status of the SATCOM systems 101, 102 in the communications system 100. If communications management system 130 does not receive a status update, or if it receives notice of a fault from a particular SATCOM system, communications management system 130 cannot use that particular SATCOM system for satellite communications.

Figure 2A:
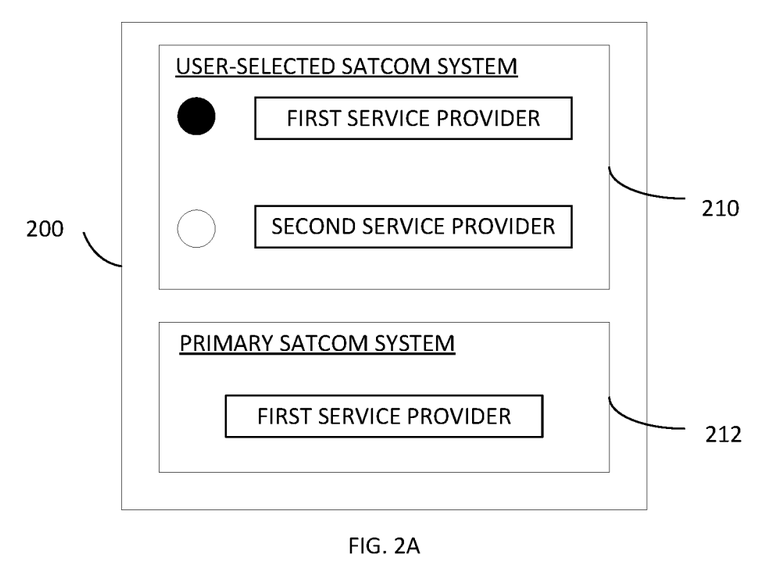
FIGS. 2A and 2B are diagrams of an example human machine interface used to select a primary SATCOM system.
Figure 2B:
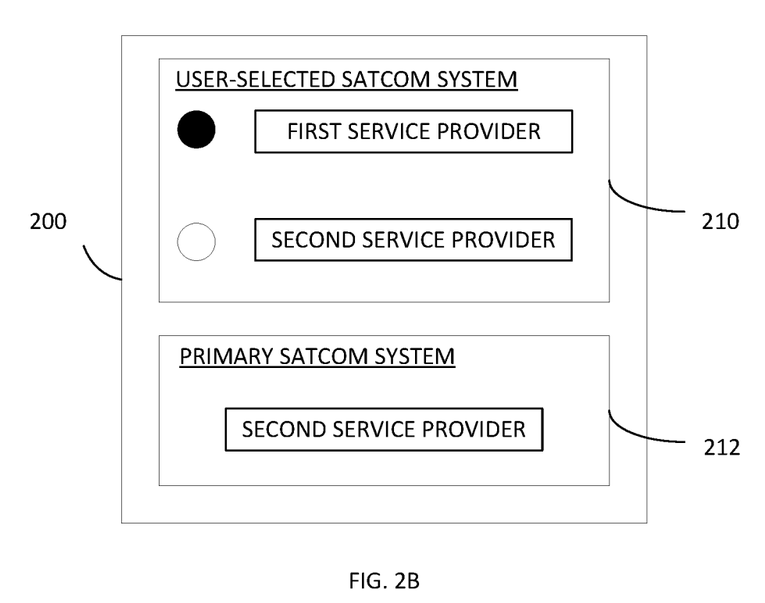

FIGS. 2A-2B depict two illustrative representations of a human machine interface 200 used to select a preferred SATCOM system for communications, which may then be designated as the primary SATCOM system. Human machine interface 200 can be a visual display interface included with or otherwise communicatively coupled to communications management system 130 to present data and enable user selection of a SATCOM system. In some examples, human machine interface 200 is a graphical user interface (GUI). In some examples, human machine interface 200 has touch screen functionality. In other examples, the user interacts with the human machine interface 200 via a computer mouse, touchpad, or other input device. FIGS. 2A and 2B represent various illustrations of a human machine interface 200 and are not exclusive embodiments, but instead show various operating conditions that may be experienced. In the example shown in FIGS. 2A-2B, human machine interface 200 includes a first pane 210, which is used to select the preferred SATCOM system that will have the highest priority for being selected as the primary SATCOM system. In the examples shown in FIGS. 2A-2B, the human machine interface 200 also includes a second pane 212 for displaying which SATCOM system is currently being used by the communications management system 130 for satellite communications. In some examples, human machine interface 200 may include additional panes or features as described below.

When a user desires to communicate using a particular SATCOM system, the user selects the particular SATCOM system via the first pane 210 of the human machine interface 200 to designate the user-selected SATCOM system. In some examples, the first pane 210 can show a list of available SATCOM systems and the user can select a SATCOM system from the displayed list. In some examples, the SATCOM systems are represented in first pane 210 by the service provider associated with the SATCOM systems. Although the human machine interface 200 depicts only two SATCOM systems, the number of SATCOM systems can vary dependent on the amount of SATCOM systems included in the communications system 100.

As shown in FIG. 2A-2B, the first service provider is selected by the corresponding filled black circle displayed next to the first service provider box under priority selection tab 210. In the example shown in FIG. 2A, the user-selected SATCOM system associated with the first service provider is available, and the second pane 212 displays the first service provider as the primary SATCOM system. In contrast, in the example shown in FIG. 2B, the user-selected SATCOM system associated with the first service provider is unavailable, and the second pane 212 displays the second service provider as the primary SATCOM system. Thus, due to the presence of some fault or inability to communicate using the SATCOM system associated with the first service provider, the primary SATCOM system is selected to be the SATCOM system associated with the second service provider in the example shown in FIG. 2B. In addition to panes 210, 212, human machine interface 200 may further include additional panes or features that describe the nature of the error causing the user-selected SATCOM system to be unavailable. Such error can be attributable to a faulty connection between the communications management system and the user-selected SATCOM system, or to the failure of the user-selected SATCOM system to establish a communications link. In some examples, the human machine interface 200 can display a separate alert to the user indicating that the primary SATCOM system has been switched to a different SATCOM system or that the user-selected SATCOM is not being used as the primary SATCOM system.

Figure 3:
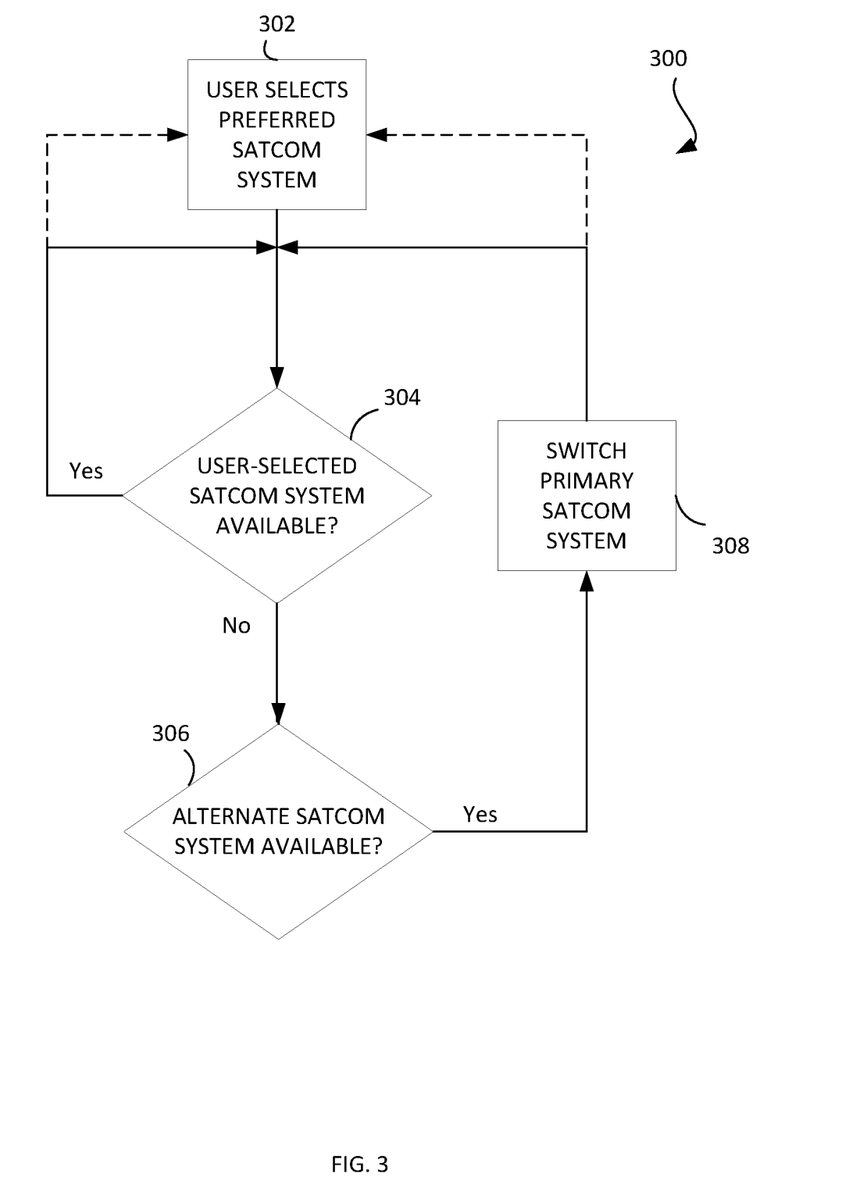
FIG. 3 is a flow diagram of an example method for selecting a primary SATCOM system based on user input.

FIG. 3 illustrates a flow diagram of an example method 300 for selecting a primary SATCOM system. The method 300 may be performed using the techniques described above with respect to FIGS. 1-2, but may be implemented via other techniques as well. The blocks of the flow diagram have been arranged in a generally sequential manner for ease of explanation; however, it is to be understood that this arrangement is merely exemplary, and it should be recognized that the processing associated with the system logic described herein (and the blocks shown in the Figures) may occur in a different order (for example, where at least some of the processing associated with the blocks is performed in parallel and/or in an event-driven manner).

The method begins with a user selecting a SATCOM system of a plurality of SATCOM systems (block 302). Selection can be made via a user interface such as the interface 200 described in FIGS. 2A and 2B, which can be communicatively coupled to a communications management system or other processor. The communications management system then designates the user-selected SATCOM system as the primary SATCOM system.

The method 300 further includes determining whether the user-selected SATCOM system is available (block 304). In some examples, determining whether the user-selected SATCOM system is available at block 304 includes determining whether the user-selected SATCOM system reported a fault. A fault may exist between the communications management system and the user-selected SATCOM system, and/or internally from the SATCOM system itself. For example, the user-selected SATCOM system may experience a circuit failure between the SDU and the antenna.

In some examples, determining whether the user-selected SATCOM system is available at block 304 may additionally or alternatively include determining whether the user-selected SATCOM has experienced a loss of communication with an external entity. A communication loss can be determined where the primary SATCOM system fails to establish a communications link, even when the SATCOM system is internally functioning properly and communicating with the communications management system. A loss of communication may occur, for example, when the primary SATCOM system establishes a communications link with a ground station and later fails to maintain the communications link (for example, the aircraft travels too far away from the ground station).

In some examples, determining whether the user-selected SATCOM system is available at block 304 may additionally or alternatively include determining whether the user-selected SATCOM system has experienced a failed datalink message transmission. For example, the user-selected SATCOM system may report a message sent via datalink (e.g., an ACARS message) was not successfully transmitted. A message transmission failure may occur because the datalink protocol is not supported by the ground station, or because the aircraft is out of range.

If the user-selected SATCOM system is available, the method 300 proceeds back to block 304 to reassess at a later time whether the user-selected SATCOM system is still available. Alternatively, the method 300 can optionally revert back to block 302 if a user selects a different SATCOM system to be the user-selected SATCOM system.

In contrast, if the user-selected SATCOM system is not available, the method 300 determines whether an alternate SATCOM system is available (block 306). In some examples, determining whether the alternate SATCOM system is available includes determining whether the alternate SATCOM system has experienced a fault, a loss of communication, or a failed datalink message transmission. If one or more of the above malfunctions are detected, then the SATCOM system is unavailable and method 300 may repeat block 306 for another SATCOM system until each SATCOM system included in a communications system has been examined. In a situation where no alternate SATCOM system is available, the primary SATCOM system remains the user-selected SATCOM system.

However, if an alternate SATCOM system is available, method 300 includes switching the primary SATCOM system from the user-selected SATCOM system to the alternate SATCOM system (block 308). The switching is performed automatically by the communications management system. Once the primary SATCOM system designation is switched to the alternate SATCOM system, method 300 optionally includes determining whether the user-selected SATCOM system is still available at a later time (block 304) and whether the alternate SATCOM system is still available at a later time (block 306). A user may also optionally select a different SATCOM system after the primary SATCOM system has been switched, in which case method 300 optionally reverts back to block 302.

Figure 4:
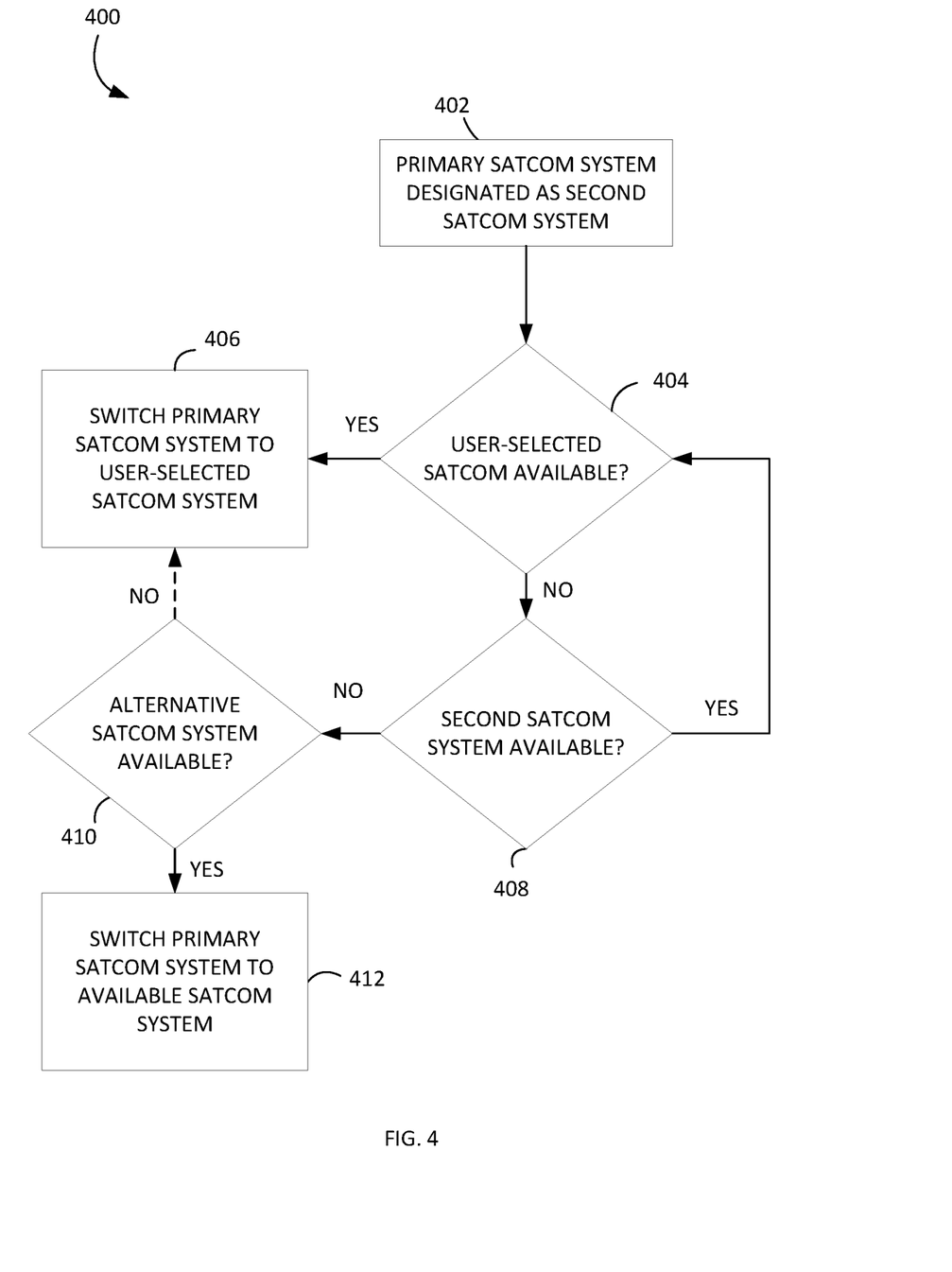
FIG. 4 is a flow diagram of an example method for operating a communications system after the primary SATCOM system is switched to an alternative available SATCOM system.

FIG. 4 illustrates a flow diagram of an example method 400 for operating a communications system after the primary SATCOM system is switched to an alternative available SATCOM system. Similar to FIG. 3, FIG. 4 can be implemented using the techniques described above with respect to FIGS. 1-3 but may be implemented via other means as well.

The method 400 includes designating the primary SATCOM system as a second (alternate) SATCOM system distinct from the user-selected SATCOM system (block 402). The designation is made when the method 400 determines that the user-selected SATCOM system is or becomes unavailable and switches the primary SATCOM system to be the second (alternate) SATCOM system as described in block 308 of FIG. 3. Additionally, the second SATCOM system has been determined to be available as described in block 306 of FIG. 3. In that case, the primary SATCOM system is automatically switched from the user-selected SATCOM system to the second SATCOM system.

The method 400 further includes determining whether the user-selected SATCOM system is available (block 404). Since the user-selected SATCOM is preferred to be selected as the primary SATCOM system, the status of the user-selected SATCOM system can be continuously or periodically monitored to determine if the user-selected SATCOM system can be reinstated as the primary SATCOM system. In some examples, the techniques described above can be used to determine whether the user-selected SATCOM system is available. In some examples, the status of whether the user-selected SATCOM system is available can be determined by checking the user-selected SATCOM system at periodic time intervals.

If it is determined that the user-selected SATCOM system is available, the method 400 proceeds with switching the primary SATCOM system to the user-selected SATCOM system (block 406). Once the switch is made, the user-selected SATCOM system can be periodically monitored to determine whether it is available as described in FIG. 3.

In contrast, if the user-selected SATCOM system is still unavailable, method 400 further includes determining whether the second SATCOM system is available (block 408). In some examples, this determination includes determining whether the second SATCOM system has experienced a fault, loss of communication, or a datalink message transmission failure as described above. If no malfunction is detected, then the second SATCOM system remains the primary SATCOM system, and the method 400 proceeds back to block 404 to determine whether the user-selected SATCOM system is available at a later time period.

If the second SATCOM system is no longer available, the method 400 optionally includes determining whether another alternative (third) SATCOM system is available that is distinct from the user-selected SATCOM system and the second SATCOM system (block 410). If yes, then the method 400 includes switching to an alternate (third) SATCOM system (block 412). If no alternative SATCOM system is available, then the second SATCOM system may remain the primary SATCOM system until another SATCOM system (including the user-selected SATCOM system) becomes available. Alternatively, method 400 may revert back to block 406 and optionally switch to the user-selected SATCOM system if the second SATCOM system is unavailable and no other SATCOM system is available.

Figure 5:
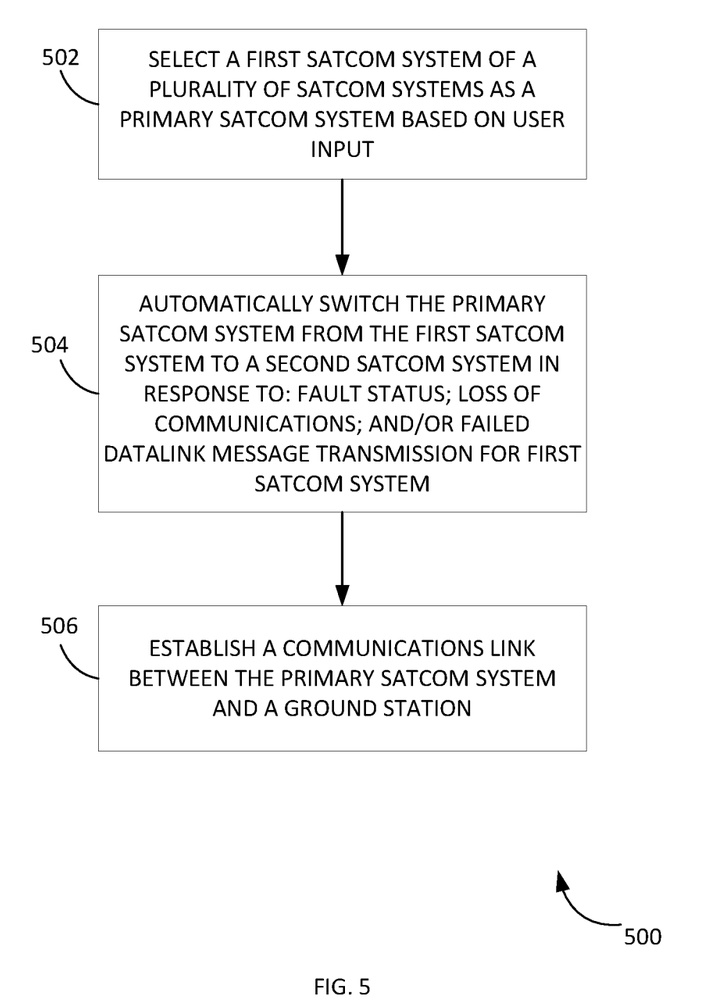
FIG. 5 is a flow diagram of an example method of selecting a primary SATCOM system.

FIG. 5 illustrates a flow diagram of an example method of selecting a primary SATCOM system. FIG. 5 may be implemented using the techniques described with respect to FIGS. 1-4, but may be implemented using other techniques as well.

The method 500 includes selecting a first SATCOM system of a plurality of SATCOM systems as a primary SATCOM system based on user input (block 502). The user input can be provided via a human machine interface as described with respect to FIGS. 1-2B. When selecting the primary SATCOM system, the SATCOM systems need not be hard-wired or coded to include a default priority assignment, and the crosstalk bus used to assign default priorities between SATCOM systems is removed. Rather, designation of the primary SATCOM system is determined by a communications management system, such as a CMU or CMF, or other processor configured to manage communications between a plurality of SATCOM systems.

Method 500 further includes automatically switching the primary SATCOM system from the first SATCOM system to a second SATCOM system in response to a fault status, loss of communications, and/or failed datalink message transmission for the first SATCOM system (block 504). In some examples, the primary SATCOM system is not switched until the second SATCOM system is determined to be available. In some examples, the first SATCOM system is communicatively coupled to a first ground station via a first data service provider, the second SATCOM system is communicatively coupled to a second ground station via a second data service provider, and the first data service provider is distinct from the second data service provider. Additionally, or alternatively, method 500 can display a message or alert via the communications management system that indicates the primary SATCOM system has been switched from the first SATCOM system to the second SATCOM system.

Method 500 further includes establishing a communications link between the primary SATCOM system and a ground station, as illustrated in block 506. A communications link can be established using a contact message and acknowledgement or using other known techniques.

The methods and techniques described herein may be implemented in digital electronic circuitry, or with a programmable processor (for example, a special-purpose processor or a general-purpose processor such as a computer) firmware, software, or in various combinations of each.

Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed ASICs.

Example Embodiments

Example 1 includes a method, comprising: selecting, with a communications management system, a first satellite communications (SATCOM) system of a plurality of SATCOM systems as a primary SATCOM system based on user input, received by a human machine interface, that identifies the first SATCOM system as a user-selected SATCOM system; automatically switching, with the communications management system, the primary SATCOM system from the first SATCOM system to a second SATCOM system of the plurality of SATCOM systems in response to: a fault status for the first SATCOM system; a loss of channel availability for the first SATCOM system; and/or a failed datalink message transmission for the first SATCOM system; and establishing a communication link between the primary SATCOM system and a ground station.

Example 2 includes the method of Example 1, wherein the first SATCOM system is communicatively coupled to a first ground station via a first data service provider, wherein the second SATCOM system is communicatively coupled to a second ground station via a second data service provider, wherein the first data service provider is distinct from the second data service provider.

Example 3 includes the method of any of Examples 1-2, wherein the communications management system comprises a communications management unit or a communications management function that is communicatively coupled to the first SATCOM system and the second SATCOM system.

Example 4 includes the method of any of Examples 1-3, wherein the first SATCOM system is not directly coupled to the second SATCOM system.

Example 5 includes the method of any of Examples 1-4, further comprising: determining that the first SATCOM system is not available; in response to determining that the first SATCOM system is unavailable, determining whether the second SATCOM system is available based on at least one of: a fault status for the second SATCOM system, a loss of channel availability for the second SATCOM system, and a failed datalink message transmission for the second SATCOM system; and in response to determining that the second SATCOM system is available, automatically switching the primary SATCOM system to the second SATCOM system.

Example 6 includes the method of any of Examples 1-5, further comprising: in response to automatically switching the primary SATCOM system to the second SATCOM system, determining whether the first SATCOM system is available based on at least one of: a fault status for the first SATCOM system, a loss of channel availability for the first SATCOM system, and a failed datalink message transmission for the first SATCOM system; and automatically switching the primary SATCOM system back to the first SATCOM system when the first SATCOM system is determined to be available.

Example 7 includes the method of any of Examples 1-6, further comprising: displaying a message via the communications management system that indicates the primary SATCOM system has been switched from the first SATCOM system to the second SATCOM system.

Example 8 includes a system, comprising: a plurality of satellite communications (SATCOM) systems comprising a first SATCOM system and a second SATCOM system; and a communications management system comprising at least one processor, wherein the at least one processor is configured to: select the first SATCOM system as a primary SATCOM system based on user input, received by a human machine interface, that identifies the first SATCOM system as a user-selected SATCOM system, automatically switch the primary SATCOM system from the first SATCOM system to the second SATCOM system in response to: a fault status for the first SATCOM system, a loss of channel availability for the first SATCOM system, and/or a failed datalink message transmission for the first SATCOM system, and establish a communication link between the primary SATCOM system and a ground station.

Example 9 includes the system of Example 8, wherein the first SATCOM system is communicatively coupled to a first ground station via a satellite network of a first data service provider, wherein the second SATCOM system is communicatively coupled to a second ground station via a satellite network of a second data service provider, wherein the first data service provider is distinct from the second data service provider.

Example 10 includes the system of any of Examples 8-9, wherein the communications management system comprises a communications management unit or a communications management function that is communicatively coupled to the first SATCOM system and the second SATCOM system.

Example 11 includes the system of any of Examples 8-10, wherein the first SATCOM system is not directly coupled to the second SATCOM system.

Example 12 includes the system of any of Examples 8-11, wherein the at least one processor is further configured to: determine whether the first SATCOM system is available; in response to a determination that the first SATCOM system is unavailable, determine whether the second SATCOM system is available based on at least one of: a fault status for the second SATCOM system, a loss of channel availability for the second SATCOM system, and a failed datalink message transmission for the second SATCOM system; and in response to a determination that the second SATCOM system is available, automatically switch the primary SATCOM system to the second SATCOM system.

Example 13 includes the system of any of Examples 8-12, wherein the at least one processor is further configured to: in response to automatically switching the primary SATCOM system to the second SATCOM system, determine whether the first SATCOM system is available based on at least one of: a fault status for the first SATCOM system, a loss of channel availability for the first SATCOM system, and a failed datalink message transmission for the first SATCOM system; and automatically switch the primary SATCOM system back to the first SATCOM system when the first SATCOM system is determined to be available.

Example 14 includes the system of any of Examples 8-13, wherein the communications management system is further configured to display a message that indicates the primary SATCOM system has been switched from the first SATCOM system to the second SATCOM system.

Example 15 includes the system of any of Examples 8-14, wherein the plurality of SATCOM systems comprises at least three SATCOM systems, and wherein the at least one processor is further configured to: determine whether the first SATCOM system is available based on at least one of: a fault status for the first SATCOM system, a loss of channel availability for the first SATCOM system, and a failed datalink message transmission for the first SATCOM system; in response to a determination that the first SATCOM system is unavailable, determine whether the second SATCOM system is available based on at least one of: a fault status for the second SATCOM system, a loss of channel availability for the second SATCOM system, and a failed datalink message transmission for the second SATCOM system; in response to a determination that the second SATCOM system is unavailable, determine whether the third SATCOM system is available based on at least one of: a fault status for the third SATCOM system, a loss of channel availability for the third SATCOM system, and a failed datalink message transmission for the third SATCOM system; and in response to a determination that the third SATCOM system is available, automatically switch the primary SATCOM system to the third SATCOM system.

Example 16 includes a non-transitory machine-readable medium having computer-executable instructions stored thereon which, when executed by one or more processors, cause the one or more processors to implement a method of operating a plurality of satellite communications (SATCOM) systems, the method comprising: selecting a first satellite communications (SATCOM) system of a plurality of SATCOM systems as a primary SATCOM system based on user input, received by a human machine interface, that identifies the first SATCOM system as a user-selected SATCOM system; automatically switching the primary SATCOM system from the first SATCOM system to a second SATCOM system of the plurality of SATCOM systems in response to: a fault status for the first SATCOM system; a loss of channel availability for the first SATCOM system; and/or a failed datalink message transmission for the first SATCOM system; and establishing a communication link between the primary SATCOM system and a ground station.

Example 17 includes the non-transitory machine-readable medium of Example 16, wherein the first SATCOM system is communicatively coupled to a first ground station via a satellite network of a first data service provider, wherein the second SATCOM system is communicatively coupled to a second ground station via a satellite network of a second data service provider, wherein the first data service provider is distinct from the second data service provider.

Example 18 includes the non-transitory machine-readable medium of any of Examples 16-17, wherein the first SATCOM system is not directly coupled to the second SATCOM system.

Example 19 includes the non-transitory machine-readable medium of any of Examples 16-18, wherein the method further comprises: determining that the first SATCOM system is not available; in response to determining that the first SATCOM system is unavailable, determining whether the second SATCOM system is available based on at least one of: a fault status for the second SATCOM system, a loss of channel availability for the second SATCOM system, and a failed datalink message transmission for the second SATCOM system; and in response to determining that the second SATCOM system is available, automatically switching the primary SATCOM system to the second SATCOM system.

Example 20 includes the non-transitory machine-readable medium of any of Examples 16-19, wherein the method further comprises: in response to automatically switching the primary SATCOM system to the second SATCOM system, determining whether the first SATCOM system is available based on at least one of: a fault status for the first SATCOM system, a loss of channel availability for the first SATCOM system, and a failed datalink message transmission for the first SATCOM system; and automatically switching the primary SATCOM system back to the first SATCOM system when the first SATCOM system is determined to be available.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A method, comprising:
selecting, with a communications management system, a first satellite communications (SATCOM) system of a plurality of SATCOM systems as a primary SATCOM system based on user input, received by a human machine interface, that identifies the first SATCOM system as a user-selected SATCOM system, wherein each SATCOM system of the plurality of SATCOM systems is configured to enable communications between the communications management system and one or more satellites;
automatically switching, with the communications management system, the primary SATCOM system from the first SATCOM system to a second SATCOM system of the plurality of SATCOM systems in response to:
a fault status for the first SATCOM system;
a loss of channel availability for the first SATCOM system; and/or
a failed datalink message transmission for the first SATCOM system; and
establishing a communication link between the primary SATCOM system and a ground station,
wherein the first SATCOM system and the communications management system are communicatively coupled to a first ground station via a first data service provider, wherein the second SATCOM system and the communications management system are communicatively coupled to a second ground station via a second data service provider, wherein the first data service provider is distinct from the second data service provider.
2. The method of claim 1, wherein the communications management system comprises a communications management unit or a communications management function that is communicatively coupled to the first SATCOM system and the second SATCOM system.

3. The method of claim 1, wherein the first SATCOM system is not directly coupled to the second SATCOM system.

4. The method of claim 1, further comprising:
  determining that the first SATCOM system is not available;
  in response to determining that the first SATCOM system is unavailable, determining whether the second SATCOM system is available based on at least one of: a fault status for the second SATCOM system, a loss of channel availability for the second SATCOM system, and a failed datalink message transmission for the second SATCOM system; and
  in response to determining that the second SATCOM system is available, automatically switching the primary SATCOM system to the second SATCOM system.

5. The method of claim 1, further comprising:
  in response to automatically switching the primary SATCOM system to the second SATCOM system, determining whether the first SATCOM system is available based on at least one of: a fault status for the first SATCOM system, a loss of channel availability for the first SATCOM system, and a failed datalink message transmission for the first SATCOM system; and
  automatically switching the primary SATCOM system back to the first SATCOM system when the first SATCOM system is determined to be available.

6. The method of claim 1, further comprising: displaying a message via the communications management system that indicates the primary SATCOM system has been switched from the first SATCOM system to the second SATCOM system.

7. A system, comprising:
  a plurality of satellite communications (SATCOM) systems comprising a first SATCOM system and a second SATCOM system; and
  a communications management system comprising at least one processor, wherein each SATCOM system of the plurality of SATCOM systems is configured to enable communications between the communications management system and one or more satellites, wherein the at least one processor is configured to:
    select the first SATCOM system as a primary SATCOM system based on user input, received by a human machine interface, that identifies the first SATCOM system as a user-selected SATCOM system,
    automatically switch the primary SATCOM system from the first SATCOM system to the second SATCOM system in response to:
      a fault status for the first SATCOM system,
      a loss of channel availability for the first SATCOM system, and/or
      a failed datalink message transmission for the first SATCOM system, and
    establish a communication link between the primary SATCOM system and a ground station,
    wherein the first SATCOM system and the communications management system are communicatively coupled to a first ground station via a first data service provider, wherein the second SATCOM system and the communications management system are communicatively coupled to a second ground station via a second data service provider, wherein the first data service provider is distinct from the second data service provider.

8. The system of claim 7, wherein the communications management system comprises a communications management unit or a communications management function that is communicatively coupled to the first SATCOM system and the second SATCOM system.

9. The system of claim 7, wherein the first SATCOM system is not directly coupled to the second SATCOM system.

10. The system of claim 7, wherein the at least one processor is further configured to:
  determine whether the first SATCOM system is available;
  in response to a determination that the first SATCOM system is unavailable, determine whether the second SATCOM system is available based on at least one of: a fault status for the second SATCOM system, a loss of channel availability for the second SATCOM system, and a failed datalink message transmission for the second SATCOM system; and
  in response to a determination that the second SATCOM system is available, automatically switch the primary SATCOM system to the second SATCOM system.

11. The system of claim 7, wherein the at least one processor is further configured to:
  in response to automatically switching the primary SATCOM system to the second SATCOM system, determine whether the first SATCOM system is available based on at least one of: a fault status for the first SATCOM system, a loss of channel availability for the first SATCOM system, and a failed datalink message transmission for the first SATCOM system; and
  automatically switch the primary SATCOM system back to the first SATCOM system when the first SATCOM system is determined to be available.

12. The system of claim 7, wherein the communications management system is further configured to display a message that indicates the primary SATCOM system has been switched from the first SATCOM system to the second SATCOM system.

13. The system of claim 7, wherein the plurality of SATCOM systems comprises at least three SATCOM systems, and wherein the at least one processor is further configured to:
  determine whether the first SATCOM system is available based on at least one of: a fault status for the first SATCOM system, a loss of channel availability for the first SATCOM system, and a failed datalink message transmission for the first SATCOM system;
  in response to a determination that the first SATCOM system is unavailable, determine whether the second SATCOM system is available based on at least one of: a fault status for the second SATCOM system, a loss of channel availability for the second SATCOM system, and a failed datalink message transmission for the second SATCOM system;
  in response to a determination that the second SATCOM system is unavailable, determine whether a third SATCOM system of the at least three SATCOM systems is available based on at least one of: a fault status for the third SATCOM system, a loss of channel availability for the third SATCOM system, and a failed datalink message transmission for the third SATCOM system; and
  in response to a determination that the third SATCOM system is available, automatically switch the primary SATCOM system to the third SATCOM system.

14. A non-transitory machine-readable medium having computer-executable instructions stored thereon which, when executed by one or more processors, cause the one or more processors to implement a method of operating a plurality of satellite communications (SATCOM) systems, the method comprising:
  selecting a first satellite communications (SATCOM) system of a plurality of SATCOM systems as a primary SATCOM system based on user input, received by a human machine interface, that identifies the first SATCOM system as a user-selected SATCOM system, wherein each SATCOM system of the plurality of SATCOM systems is configured to enable communications between a communications management system and one or more satellites;
  automatically switching the primary SATCOM system from the first SATCOM system to a second SATCOM system of the plurality of SATCOM systems in response to:
    a fault status for the first SATCOM system;
    a loss of channel availability for the first SATCOM system; and/or
    a failed datalink message transmission for the first SATCOM system; and
  establishing a communication link between the primary SATCOM system and a ground station,
  wherein the first SATCOM system and the communications management system are communicatively coupled to a first ground station via a first data service provider, wherein the second SATCOM system and the communications management system are communicatively coupled to a second ground station via a second data service provider, wherein the first data service provider is distinct from the second data service provider.

15. The non-transitory machine-readable medium of claim 14, wherein the first SATCOM system is not directly coupled to the second SATCOM system.

16. The non-transitory machine-readable medium of claim 14, wherein the method further comprises:
  determining that the first SATCOM system is not available;
  in response to determining that the first SATCOM system is unavailable, determining whether the second SATCOM system is available based on at least one of: a fault status for the second SATCOM system, a loss of channel availability for the second SATCOM system, and a failed datalink message transmission for the second SATCOM system; and
  in response to determining that the second SATCOM system is available, automatically switching the primary SATCOM system to the second SATCOM system.

17. The non-transitory machine-readable medium of claim 14, wherein the method further comprises:
  in response to automatically switching the primary SATCOM system to the second SATCOM system, determining whether the first SATCOM system is available based on at least one of: a fault status for the first SATCOM system, a loss of channel availability for the first SATCOM system, and a failed datalink message transmission for the first SATCOM system; and
  automatically switching the primary SATCOM system back to the first SATCOM system when the first SATCOM system is determined to be available.

* * * * *